US012731881B2

(12) United States Patent
Zhu et al.

(10) Patent No.: US 12,731,881 B2
(45) Date of Patent: Sep. 8, 2026

(54) TRANSPARENT ANTENNA COEXISTING WITH OTHER TRANSPARENT STRUCTURES IN AUGMENTED REALITY GLASS LENSES

(71) Applicant: Meta Platforms Technologies, LLC, Menlo Park, CA (US)

(72) Inventors: Jiang Zhu, Cupertino, CA (US); Yasuo Morimoto, Cupertino, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 54 days.

(21) Appl. No.: 18/893,250

(22) Filed: Sep. 23, 2024

(65) Prior Publication Data

US 2025/0015479 A1 Jan. 9, 2025

Related U.S. Application Data

(63) Continuation of application No. 17/894,896, filed on Aug. 24, 2022, now Pat. No. 12,315,984.

(60) Provisional application No. 63/344,351, filed on May 20, 2022.

(51) Int. Cl.

| | |
|---|---|
| ***H01Q 1/27*** | (2006.01) |
| ***G02C 7/10*** | (2006.01) |
| ***G02C 11/00*** | (2006.01) |
| ***H01Q 1/22*** | (2006.01) |
| ***H01Q 1/38*** | (2006.01) |

(52) U.S. Cl.

CPC ............... *H01Q 1/22* (2013.01); *G02C 7/101* (2013.01); *G02C 11/10* (2013.01); *H01Q 1/273* (2013.01); *H01Q 1/38* (2013.01)

(58) Field of Classification Search

CPC .......... H01Q 1/273; H01Q 1/22; H01Q 1/243; H01Q 1/38; H01Q 13/10; H01Q 7/00; G02C 7/10; G02C 11/10

See application file for complete search history.

(56) References Cited

U.S. PATENT DOCUMENTS

| | | | |
|---|---|---|---|
| 9,547,335 B1 | 1/2017 | Bevelacqua et al. | |
| 11,237,412 B1 | 2/2022 | Olgun et al. | |
| 11,929,548 B2 * | 3/2024 | Hintermann ....... | G02B 27/0176 |
| 11,984,653 B2 * | 5/2024 | Jadidian .................. | H01Q 1/38 |

(Continued)

FOREIGN PATENT DOCUMENTS

| | | |
|---|---|---|
| EP | 3041086 A1 | 7/2016 |
| WO | 2018139111 A1 | 8/2018 |
| WO | 2023048828 A1 | 3/2023 |

OTHER PUBLICATIONS

International Search Report and Written Opinion for International Application No. PCT/US2023/022774, mailed Aug. 28, 2023, 12 pages.

*Primary Examiner* — Hasan Islam

(74) *Attorney, Agent, or Firm* — Foley & Lardner LLP

(57) ABSTRACT

The disclosed system may include a support structure, at least one lens mounted to the support structure, and a transparent antenna film layer that is disposed on at least a portion of the lens. The transparent antenna film layer may include at least one antenna, and placement of the transparent antenna film layer may form a gap between the support structure and the transparent antenna film layer. Various other apparatuses, wearable mobile devices, and methods of manufacturing are also disclosed.

20 Claims, 10 Drawing Sheets

(56) References Cited

U.S. PATENT DOCUMENTS

| | | | |
|---|---|---|---|
| 2009/0212953 | A1 | 8/2009 | Ross-Messemer |
| 2018/0102588 | A1 | 4/2018 | Szini et al. |
| 2023/0099937 | A1 | 3/2023 | Jadidian et al. |

* cited by examiner

TRANSPARENT ANTENNA COEXISTING WITH OTHER TRANSPARENT STRUCTURES IN AUGMENTED REALITY GLASS LENSES

CROSS-REFERENCE TO RELATED APPLICATIONS

This application claims priority to and the benefit of U.S. patent application Ser. No. 17/894,896, filed on Aug. 24, 2022, which application claims priority to U.S. Provisional Patent Application No. 63/344,351, filed May 20, 2022, both of which are incorporated by reference herein in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
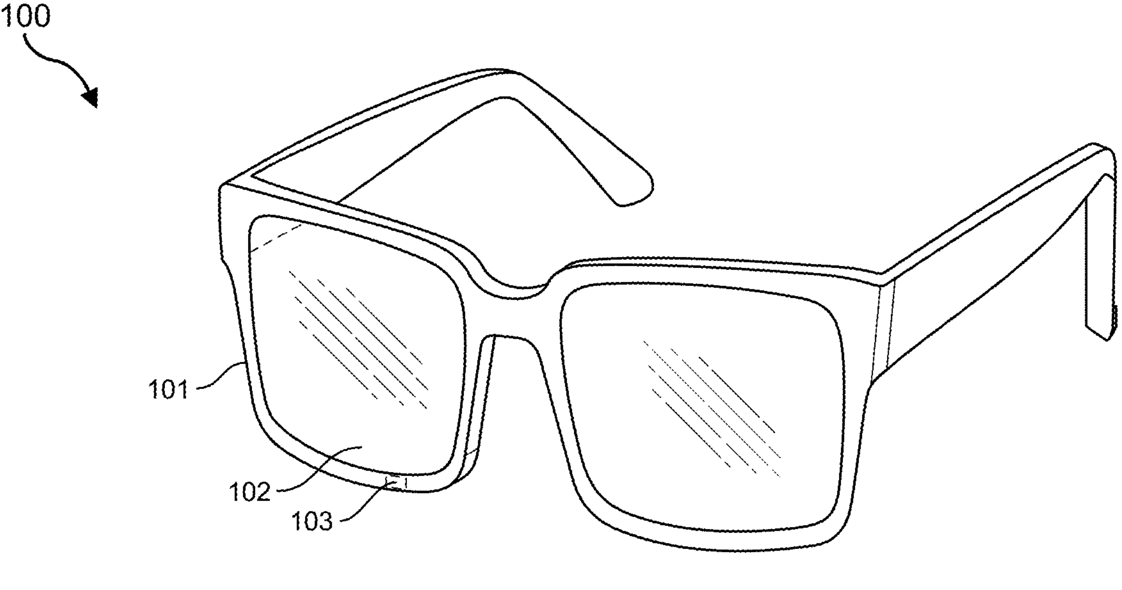
FIG. 1 is an example embodiment of a pair of augmented reality (AR) glasses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Today's mobile electronic devices implement many different types of antennas. To keep up with the evolution of wireless technology and the increasing demands of ubiquitous wireless access, wearable electronic devices may seek to support more and more wireless standards including 3G/4G/5G, WiFi, global positioning system (GPS), Bluetooth, ultrawideband (UWB), and more. To enable multi-standard wireless connectivity, these wearable devices (e.g., smartwatches or augmented reality (AR) glasses) may use several multi-band antennas within a small form factor.

In some cases, wearable electronic devices such as AR glasses may implement antennas in the temple arms or in the rims of the glasses. These antennas, however, are constrained in size due to the small form factor of the glasses and may be further constrained in where they can be placed. Moreover, the design of the device, the overall weight, or other factors may lead to continually smaller form factors with reduced size and thickness. Such form factors may have even less room for different types of antennas. In such cases, antennas may need to be further reduced in size which, in turn, decreases the antennas' performance. Still further, in small form factor devices, other electrical and mechanical components may interfere with the operation of the various antennas.

Some implementations may attempt to place antennas on the lenses of augmented reality glasses. Indeed, the lenses may be the single largest component by area on a pair of augmented reality glasses. Placing antennas on the lens glass may provide additional volume for the antennas. Moreover, the lens may have an additional amount of separation or clearance from the user's body (e.g., from their eyes or head). This may reduce the body's effects on antenna signal degradation. In cases where antennas are implemented on augmented reality glass lenses, the antennas may use transparent conductive material that acts as the radiating elements for the antenna. Because the material is transparent, the material does not block the user's vision through the lenses.

That said, however, it may be difficult to design transparent antennas on augmented reality glass lenses. For instance, the lenses of the augmented reality glasses may already have other transparent structures. For example, the lenses may have display layers, optical waveguides, active dimming layers (visible light control layers), micro-LEDs, prescription lenses, or other optical or electrical components. In some cases, one or more of these transparent layers may be used as antenna elements with decoupling structures. That said, some of the transparent layers may have high sheet resistance (e.g., greater than 10 Ohm/square), rendering those layers unusable as antenna radiating elements.

For instance, a lens may include two transparent, lossy conductive layers (e.g., indium tin oxide (ITO) layers) with an active dimming layer (e.g., a liquid crystal layer) sandwiched in between for controlling the amount of dimming provided by the lenses. For instance, the active dimming layer may include a liquid crystal layer such as a PDLC (Polymer-Dispersed Liquid Crystal) layer or a GHLC (Guest-Host Liquid Crystal) layer. Each of these liquid crystal active dimming layers is sandwiched by two layers of ITOs. In some cases, these transparent active dimming layers may absorb some of the antenna's radiation and may result in severe degradation in the antenna's radiation performance.

In the embodiments herein, antennas may be placed on augmented reality glass lenses substantially without increasing the antennas' loss from other (potentially transparent) structures in the lenses. Broadly speaking, this may be accomplished in a variety of ways, including one or more of the following: 1) adding a conductive transparent antenna layer in close proximity to the other transparent layers (e.g., the active dimming layer), 2) producing the transparent antenna layer using ITO or using a mesh metal structure (which may have higher sheet resistance (e.g., <10 Ohm/square), as compared to the other lossy transparent layers), 3) enlarging the size of the transparent antenna layer to match or be even bigger than the size of other lossy or nonconductive transparent layers to reduce radiation loss from the nonconductive layers, 4) connecting the transparent antenna layer directly to the antenna port through a flexible substrate such as a coaxial cable while the lossy transparent layers remain floating at the operating frequency of the antennas (e.g., high impedance components such as radio frequency (RF) chokes may be implemented to make lossy transparent layers floating at the RF frequencies), and 5) when the transparent antenna is in operation, coupling the lossy transparent structures to the conductive transparent antenna layer. Since, at least in some embodiments, the conductive antenna layer may be a large contributor to the antennas' radiation, the size of the transparent conductive antenna layer may be equivalent to or larger than the size of at least one of the lossy layers. These embodiments will be further described below with regard to FIGS. 1-9.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an embodiment of a wearable electronic device 100. As shown in FIG. 1, the wearable electronic device 100 may be a pair of augmented reality glasses. In other embodiments, the wearable electronic device may be a virtual reality headset, or a smartwatch, or may be some other type of mobile electronic device that implements active dimming or implements a display portion that includes at least one layer of conductive material. In the example embodiment of FIG. 1, the augmented reality (AR) glasses may include a structural frame 101 and two lenses 102, one or more of which may include an antenna 103 placed nearby. These lenses may include an active dimming layer that includes a coating of a transparent conductive oxide (TCO) such as indium tin oxide (ITO) or some other type of TCO.

The TCO material may be a poor conductor of electricity and may generally be referred to herein as a poor conductor or as a poorly conductive material. It will be recognized that when using the terms "poor conductor" or "poorly conductive materials" herein, the terms may refer to materials that are at least somewhat conductive, but are very poor conductors. Thus, poorly conductive materials may encompass materials that have a conductivity that is greater than zero, but is still very low. Thus, a poorly conductive material may refer to any material that may impair antenna performance by absorbing the antenna's radiated power. Indeed, at least some of the embodiments herein may be designed to counteract or reduce the coupling that may occur between an active dimming layer, an antenna (e.g., 103), or other type of conductive lens layer.

Figure 2:
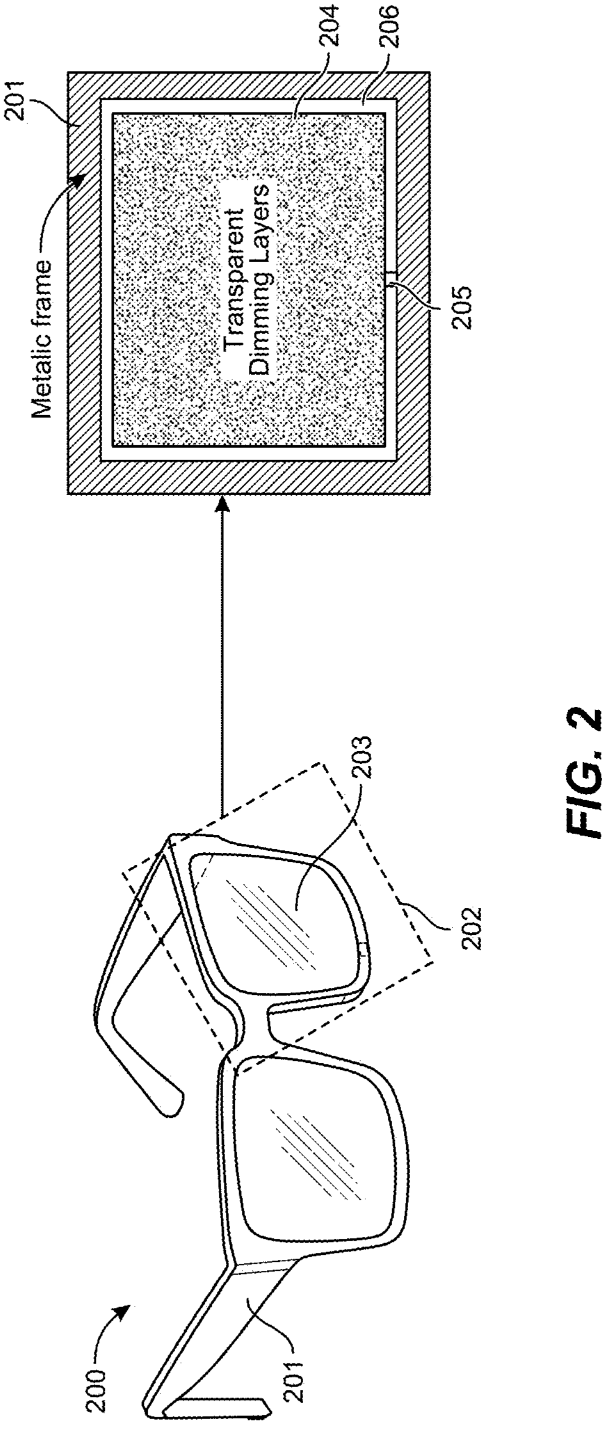
FIG. 2 is an embodiment that illustrates a pair of AR glasses and a cross-section view of the same.

FIG. 2 illustrates an embodiment of a pair of AR glasses 200 that includes a frame 201 and multiple lenses 203. The lenses of the AR glasses 200 may include optics systems that project or otherwise display digital images that are visible to the wearer of the AR glasses. In some cases, the lenses may include one or more active dimming layers. The active dimming layers may include liquid crystals or other materials that react to changes in applied voltages. These reactions may change the amount of light that is permitted to flow through the active dimming layer and reach the wearer's eyes. As noted above, the active dimming layer may include a TCO coating such as indium tin oxide. These TCOs may be partially conductive and may absorb radiated signals from nearby antennas.

As shown in FIG. 2, the frame 201 of the AR glasses 200 may be a metallic (or otherwise conductive) frame, as indicated in the cross section 202. The metallic frame 201 may surround the transparent active dimming layer(s) 204. In some embodiments, as will be described further below, a transparent antenna film layer may be applied to the transparent active dimming layer 204. The transparent antenna film layer may cover a large portion of the lens 203, but may leave a gap 206 between the antenna film layer and the metallic frame 201. In such cases, the transparent antenna film layer may be driven (e.g., via antenna feed 205) or directly stimulated to radiate signals at specified frequencies, and the gap 206 may act as a slot antenna or a loop antenna where radiated energy moves to the edges of the antenna film layer (e.g., near the gap 206) and emanates out from the edge to the surrounding environment. Thus, in this manner, a slot or loop antenna may be formed between a transparent antenna film layer and the frame of the AR glasses 200. This antenna is further described below with relation to FIGS. 3A-6.

Figure 3A:
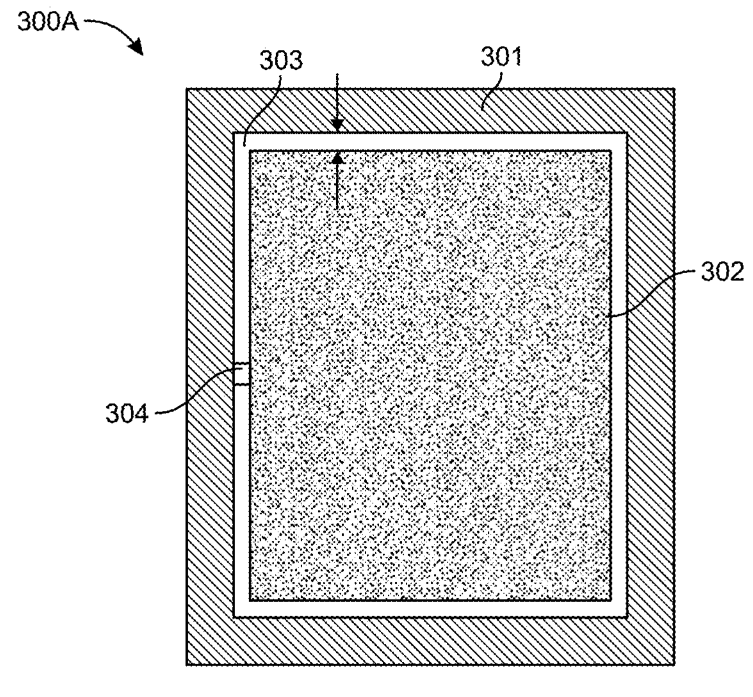
FIGS. 3A & 3B are plan and perspective cross-section views of a frame and lens of a pair of AR glasses.
Figure 3B:
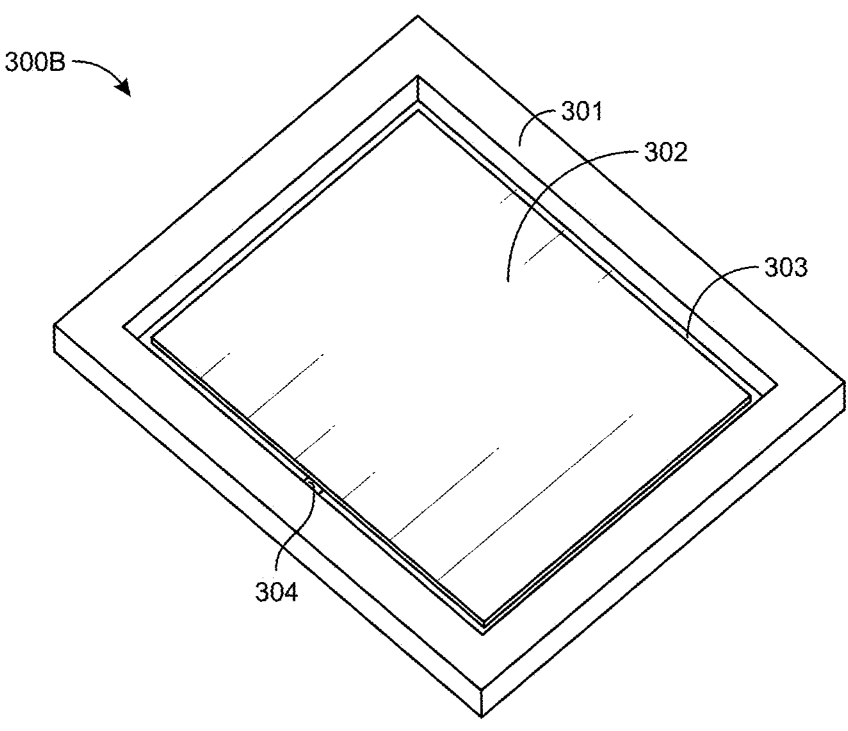

FIG. 3A illustrates an embodiment 300A of a frame 301 and a lens with a transparent antenna film layer 302. The frame 301 may be made of metal or other conductive materials. The frame may be configured to house multiple lenses (e.g., 203 of FIG. 2). Each lens may include a transparent antenna film layer 302 made of some type of transparent metal or transparent conductive film. Such transparent conductive films may be optically transparent and may be electrically conductive. These may include indium tin oxide or other TCOs, conductive polymers, carbon nanotubes, metallic grids, graphene, nanowire meshes, ultra-thin metal films, or other similar materials or combinations thereof. The transparent antenna film layer may include one or more antennas, and may be fed via an antenna feed 304.

At least in some cases, the transparent antenna film layer 302 may be spread over all but a small portion of the lens. This small portion may be uniform or substantially uniform around the edges of the lens. The portion that lacks the transparent antenna film layer 302 may form a gap 303 between the transparent antenna film layer and the frame 301. The gap 303 may provide sufficient space to ensure that electrical current from the antenna feed 304 travels to the edges of the transparent antenna film layer 302 and forms a slot antenna or a loop antenna between the edges of the transparent antenna film layer and the conductive frame 301. In such cases, the transparent antenna film layer 302 may be driven by an antenna feed and may thus be directly stimulated to radiate as an antenna. This slot or loop antenna may be configured to transmit and/or receive wireless signals through the antenna feed and associated components (e.g., tuner, amplifier, impedance matching circuit, signal processor, etc.). A perspective view of the cross section shown in FIG. 3A is found in embodiment 300B of FIG. 3B. This perspective view illustrates the gap 303 that forms between the transparent antenna film layer 302 and the conductive frame 301.

Figure 4A:
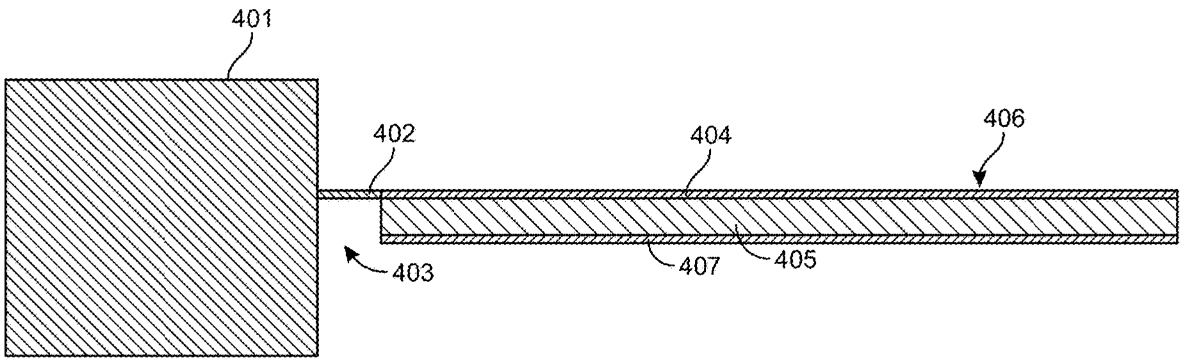
FIG. 4A illustrates a diagram of a frame and transparent antenna on a lens of a pair of AR glasses.

FIG. 4A illustrates an embodiment of a side, cross-sectional view of a frame and a lens. The frame 401 may provide a support structure for the lens 406 and potentially other electronic and/or mechanical components. The frame 401 may be made of conductive material (e.g., metal) and may include an electrical connection (e.g., an antenna feed 402) to at least one layer of the lens 406. In the embodiment of FIG. 4A, the lens 406 may include multiple layers including a transparent antenna film layer 404 that is disposed on at least a portion of the lens. The lens 406 may also include an active dimming layer 405 that may be made of liquid crystals or other active dimming elements that darken or lighten in response to changes in voltage. Still further, the lens 406 may include a bottom transparent film layer 407 that may be made of a TCO material such as indium tin oxide (ITO). This bottom transparent film layer may be electrically floating relative to the top layer 404 and relative to the metal frame 401. The transparent antenna film layer 404 may include an antenna or may, itself, be excited as an antenna. The placement of the transparent antenna film layer 404 on the lens 406 may form a gap 403 between the metal frame 401 and the transparent antenna film layer 404. This gap may surround the exterior portion of the lens, and may create a slot or loop antenna that operates by concentrating current on this exterior portion of the lens on the transparent antenna film layer 404.

Figure 4B:
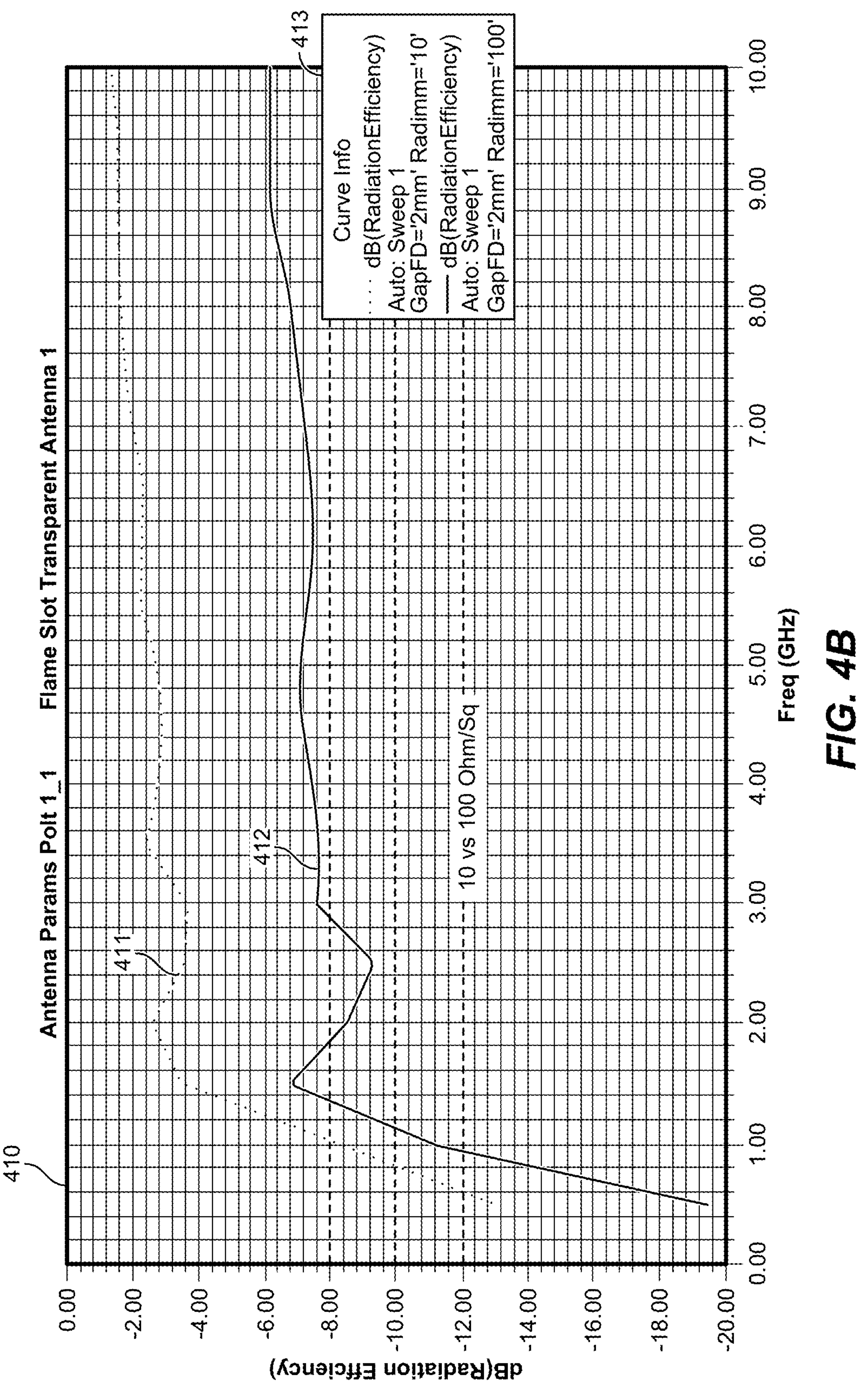
FIG. 4B illustrates a chart showing example radiation efficiency results for the transparent antenna of FIG. 4A.

In some embodiments, the resistivity of the transparent antenna film layer 404 may be set to a specified amount. For instance, the resistivity of the transparent antenna film layer 404 may be manufactured or produced to be 10 Ohm/Sq. In other cases, the transparent antenna film layer 404 may be manufactured at 100 Ohm/Sq. Chart 410 of FIG. 4B illustrates embodiments in which the measured radiation efficiency increases based on the resistivity level of the transparent antenna film layer 404. Line 411 represents potential radiation efficiency (y-axis) between 0 and 10 GHz (x-axis) when the transparent antenna film layer 404 is at 10 Ohm/Sq. Line 412 represents potential radiation efficiency when the transparent antenna film layer 404 is at 100 Ohm/Sq. (as indicated in key 413). As can be seen, the transparent antenna film layer 404 with lower resistivity has a higher radiation efficiency (in dB) over the entire frequency range. Accordingly, the resistivity level of the transparent antenna film layer 404 may be varied in different embodiments to provide a desired radiation efficiency output.

Figure 5A:
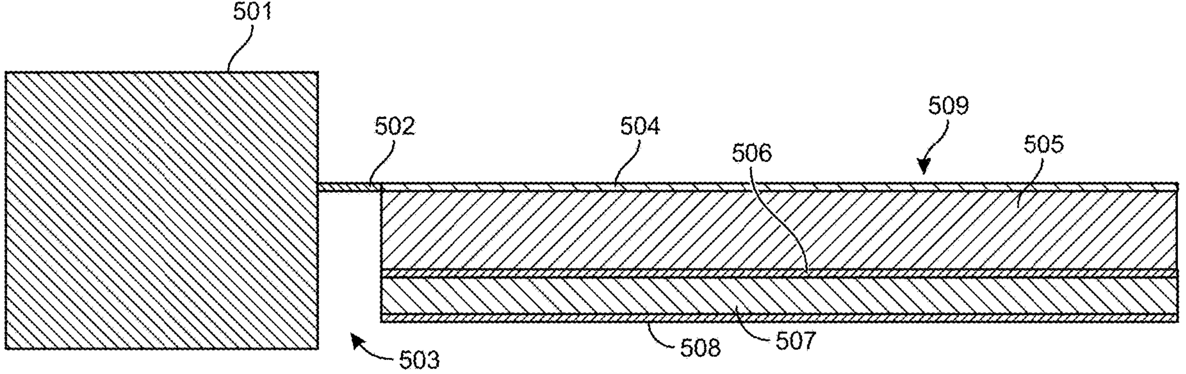
FIG. 5A illustrates a diagram of an alternative frame and transparent antenna on a lens of a pair of AR glasses.
Figure 5B:
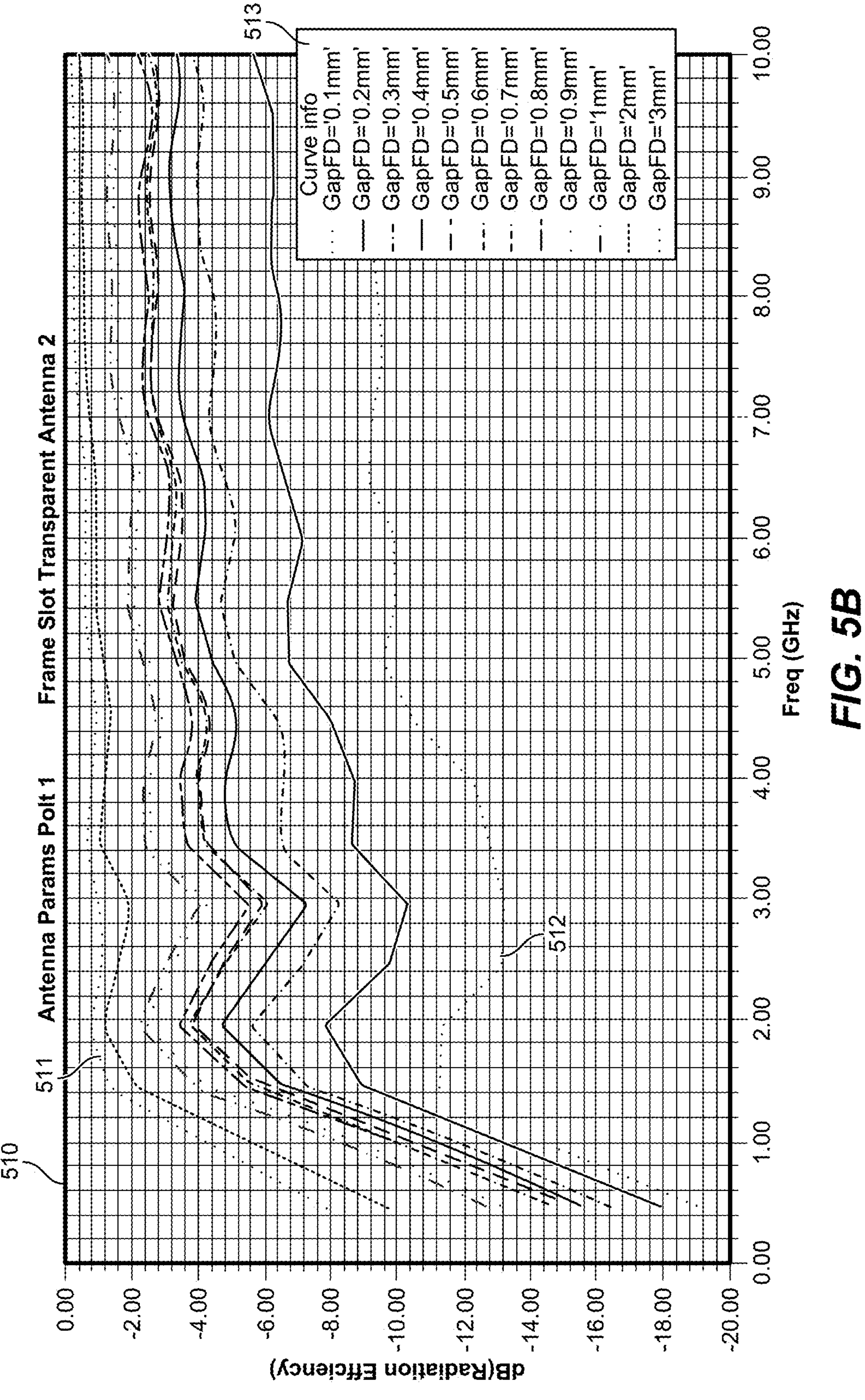
FIG. 5B illustrates a chart showing example radiation efficiency results for the transparent antenna of FIG. 5A.

FIG. 5A illustrates an embodiment of a cross section of a frame 501 (e.g., a metal or otherwise conductive frame of a pair of AR glasses) and a lens 509. The lens may include multiple different sections or layers including a transparent antenna film layer 504, a plastic or glass nonconductive layer 505, a middle transparent film layer 506 that may be made of a TCO material (e.g., ITO) and may include a transparent antenna, an active dimming layer 507, and a floating transparent film layer 508 that may also be made of a TCO material. The transparent antenna film layer 504 may include an antenna or may, itself, be excited as an antenna. The placement of the transparent antenna film layer 504 on the lens 509 may form a gap 503 between the metal frame 501 and the transparent antenna film layer 504. This gap 503 may cover (or may substantially cover) the exterior portion of the lens 509. By covering all but a portion of the lens with the transparent antenna film, the gap 503 between the conductive frame 501 and the transparent antenna film layer 504 may create a slot or loop antenna that operates by concentrating electrical current on this exterior portion of the lens 509 on the transparent antenna film layer 504.

At least in some cases, the resistivity of the transparent antenna film layer 504 may be set or adjusted to a specified amount (e.g., 1 Ohm/sq., 2 Ohm/sq., 3 Ohm/sq., 5, 10, 20, 50 Ohm/sq., etc.). The resistivity of the middle transparent film layer 506 may also be set or adjusted to a specified amount (e.g., 75 Ohm/sq., 100 Ohm/sq., 150 Ohm/sq., etc.). The chart 510 of FIG. 5B may indicate radiation efficiencies of transparent antennas at different gap sizes. As indicated in chart 513, the radiation efficiency of a transparent antenna having a gap of 0.1 mm (512) may be lower than that of system that (advantageously) includes a larger gap of 3 mm (511). Accordingly, at least in some embodiments, larger gap sizes may be implemented to provide a higher radiation efficiency for the transparent antenna.

In some embodiments, the transparent antenna film layer (e.g., 504) may be a printed transparent conductive material. The printed transparent conductive material may be applied using any of a variety of different manufacturing methods for printing materials onto glass or plastic. In some cases, the transparent antenna film layer may be meshed metal that is ultra-thin and is transparent to the human eye. In some examples, as noted above, the transparent antenna film layer may be disposed on a conductive layer of the lens. For instance, the conductive layer of the lens may be an active dimming layer that may include one or more layers of TCO material. The conductive transparent antenna film layer may cover some or all of the conductive layer of the lens, leaving a gap between the transparent antenna film layer and the conductive frame of the AR glasses. The conductive transparent antenna film layer may be connected to an antenna feed, which may be configured to stimulate the antenna film layer and cause it to radiate as an antenna.

In some cases, as shown in FIG. 5A, the transparent antenna film layer 504 may be directly electrically connected to an antenna port 502. In some examples, this direct connection to the antenna port may be provided through a flexible substrate such as a coaxial cable. As noted above, the lens 509 of FIG. 5A may include a transparent antenna film layer 504, a top nonconductive layer 505, a middle transparent film layer 506, a liquid crystal layer 507, and a bottom floating layer 508. In such cases, the lens may include multiple conductive layers that are separated by at least a specified distance (e.g., 100 um, 150 um, 200 um, etc.). The second conductive layer of the lens may be electrically floating at an operating frequency of the antenna. This electrically floating layer may provide enhanced radiation efficiency for the antenna at the antenna's operating frequency.

Figure 6:
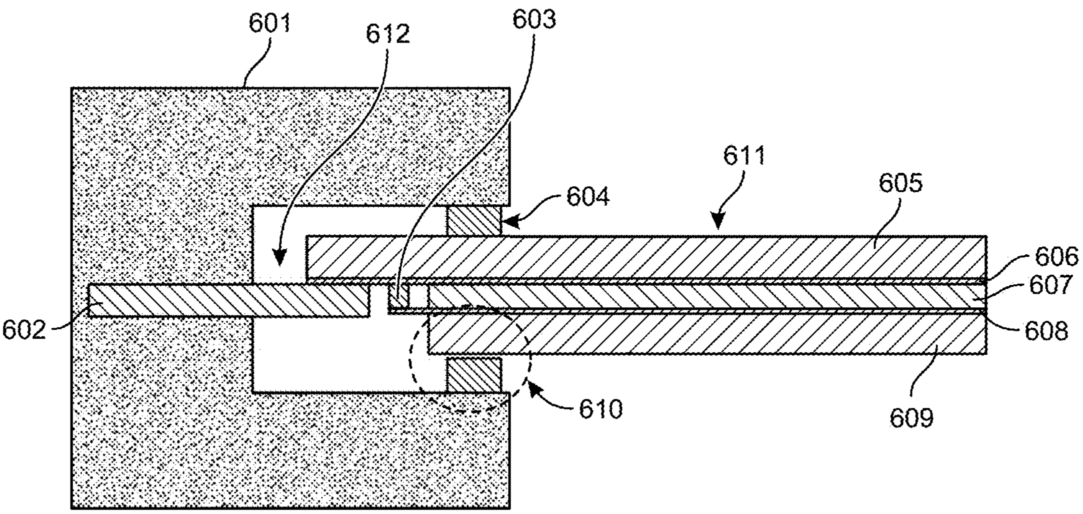
FIG. 6 illustrates a diagram of a transparent antenna embodiment in which two active dimming layers are used and a liquid crystal layer are used in a lens of a pair of AR glasses.

FIG. 6 illustrates an alternative embodiment of a conductive frame 601 and a lens 611. The lens 611 may include multiple layers (605-609) and may be connected to the frame 601 in a variety of ways. For instance, the lens may be held in place relative to the frame via rubber rings 604 or via other nonconductive fastening mechanisms. In some cases, the capacitance between the bottom plastic or glass layer 609 and the conductive frame 601 may be determined, as generally indicated by circle 610. This capacitance may then be altered in order to imbue the transparent antenna with specific characteristics. Indeed, the lens 611 may include one or more transparent film layers 606 and 608. Either or both of these transparent film layers 606/608 may include transparent antennas. These transparent film layers 606/608 may sandwich an active dimming layer 607 that may include liquid crystals or other active dimming materials. The transparent film layers 606/608 may be connected via an isolated jumper pin 603 that may connect the two layers when desired. The top transparent film layer 606 may be connected to the frame 601 via a flex connector 602 (e.g., substrate) or via some other type of electrical connector.

In some cases, the system shown in FIG. 6 may be part of a wearable mobile device such as a pair of AR glasses (e.g., 100 of FIG. 1) or a virtual reality headset. In such cases, the wearable mobile device may include a support structure (e.g., 601), at least one lens (e.g., 611) that is mounted to the support structure, and a transparent antenna film layer (e.g., 606 or 608) that is disposed on at least a portion of the lens. In such cases, the transparent antenna film layer may include at least one antenna. Placement of the transparent antenna film layer may form a gap 612 between the support structure and the transparent antenna film layer. The lens 611 may include a first conductive layer (e.g., 606) and a second conductive layer (e.g., 608) that are separated by a specified distance. This distance may include a layer of active dimming material (e.g., 607). The lens may also include an intermediary nonconductive layer (e.g., 605) disposed on top of the first conductive layer, and an intermediary nonconductive layer (e.g., 608) disposed on the bottom of the second conductive layer. The transparent antenna film layers 606 and/or 608 may be disposed on the tops or bottoms of these intermediary nonconductive layers 605/609.

In some cases, the second conductive layer 608 may be an electrically floating layer that is designed to float at the operating frequency of the transparent antenna(s) of the first conductive layer 606. In such cases, one or more impedance-optimized radio frequency (RF) chokes may be implemented to cause the second conductive layer 608 to electrically float at the operating frequency of the antenna. Additionally or alternatively, various parameters or characteristics related to the wearable device may be modified to change the operating characteristics of the transparent antenna. For example, any one or more of the following may be changed including the thickness of the transparent antenna film layer(s), the size of the transparent antenna film layer(s), the size of the gap between the support structure and the transparent antenna film layer, or the resistivity of the active dimming layer. Any one or more of these characteristics or parameters may be modified to change the operating characteristics of the antenna including radiation efficiency, total radiated power, antenna impedance, etc.

Figure 7:
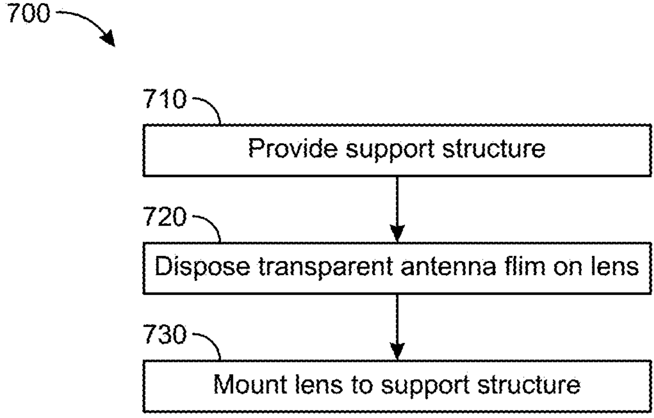
FIG. 7 is a diagram of an exemplary method of manufacturing for producing an AR glass lens having at least one transparent antenna thereon.

FIG. 7 is a flow diagram of method of manufacturing 700 for generating or producing a wearable electronic device (e.g., AR glasses) that includes at least one lens that has transparent antennas disposed thereon. The steps shown in FIG. 7 may be performed by any suitable manufacturing equipment, and may be controlled using any suitable computer-executable code and/or computing system.

The method of manufacturing of FIG. 7 may include, at step 710, providing, creating, or generating a support structure (e.g., a conductive frame). The method of manufacturing may next include, at step 720, disposing a transparent antenna film layer on at least a portion of a lens. The transparent antenna film layer may include at least one antenna. Placement of the transparent antenna film layer may form a gap between the support structure and the transparent antenna film layer, thereby acting as a slot or loop antenna. Further, at step 730, the method of manufacturing 700 may include mounting the lens with the transparent antenna film layer to the support structure. In this manner, the method of manufacturing 700 may produce AR glasses, VR headsets, or other artificial reality devices that may include transparent antenna film layers. By placing the antennas on the AR glass lenses or on other similar locations, the antennas may be moved out of the frames of these devices, thereby providing space that may be used by other electronic and mechanical components.

EXAMPLE EMBODIMENTS

Example 1: A system may include: a support structure, at least one lens mounted to the support structure, and a transparent antenna film layer that is disposed on at least a portion of the lens, the transparent antenna film layer including at least one antenna, and wherein placement of the transparent antenna film layer forms a gap between the support structure and the transparent antenna film layer.

Example 2. The system of Example 1, wherein the transparent antenna film layer comprises a printed transparent conductive material.

Example 3: The system of Examples 1 or 2, wherein the transparent antenna film layer comprises meshed metal.

Example 4: The system of any of Examples 1-3, wherein transparent antenna film layer is disposed on a conductive layer of the lens.

Example 5: The system of any of Examples 1-4, wherein the conductive layer of the lens comprises an active dimming layer.

Example 6: The system of any of Examples 1-5, wherein the transparent antenna film layer substantially covers the conductive layer of the lens.

Example 7: The system of any of Examples 1-6, wherein the transparent antenna film layer is directly electrically connected to an antenna port.

Example 8: The system of any of Examples 1-7, wherein the transparent antenna film layer is directly electrically connected to the antenna port through a flexible substrate.

Example 9: The system of any of Examples 1-8, wherein the lens includes a top nonconductive layer, a top active dimming layer, a liquid crystal layer, and a bottom floating layer.

Example 10: The system of any of Examples 1-9, wherein the lens includes a first conductive layer and a second conductive layer that are separated by at least a specified distance.

Example 11: The system of any of Examples 1-10, wherein the second conductive layer of the lens is electrically floating at an operating frequency of the antenna.

Example 12: A wearable mobile device comprising: a support structure, at least one lens mounted to the support structure, and a transparent antenna film layer that is disposed on at least a portion of the lens, the transparent antenna film layer including at least one antenna, and wherein placement of the transparent antenna film layer forms a gap between the support structure and the transparent antenna film layer.

Example 13: The wearable mobile device of Example 12, wherein the lens comprises a first conductive layer and a second conductive layer separated by at least a specified distance.

Example 14: The wearable mobile device of Examples 12 or 13, wherein the lens further comprises an intermediary nonconductive layer disposed on top of the first conductive layer, and wherein the transparent antenna film layer is disposed on the intermediary nonconductive layer.

Example 15: The wearable mobile device of any of Examples 12-14, wherein the second conductive layer is an electrically floating layer.

Example 16: The wearable mobile device of any of Examples 12-15, wherein one or more impedance-optimized radio frequency (RF) chokes are implemented to cause the second conductive layer to electrically float at an operating frequency of the antenna.

Example 17: The wearable mobile device of any of Examples 12-16, wherein at least one of a transparent antenna film layer thickness, a transparent antenna film layer size, a size of the gap between the support structure and the transparent antenna film layer, or an active dimming layer resistivity is modified to change antenna operating characteristics.

Example 18: The wearable mobile device of any of Examples 12-17, wherein the gap between the support structure and the transparent antenna film layer forms at least one of a loop antenna or a slot antenna.

Example 19: The wearable mobile device of any of Examples 12-18, wherein the support structure comprises a metal frame.

Example 20: A method of manufacturing comprising: providing a support structure, disposing a transparent antenna film layer on at least a portion of a lens, the transparent antenna film layer including at least one antenna, and wherein placement of the transparent antenna film layer forms a gap between the support structure and the transparent antenna film layer, and mounting the lens having the transparent antenna film layer to the support structure.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
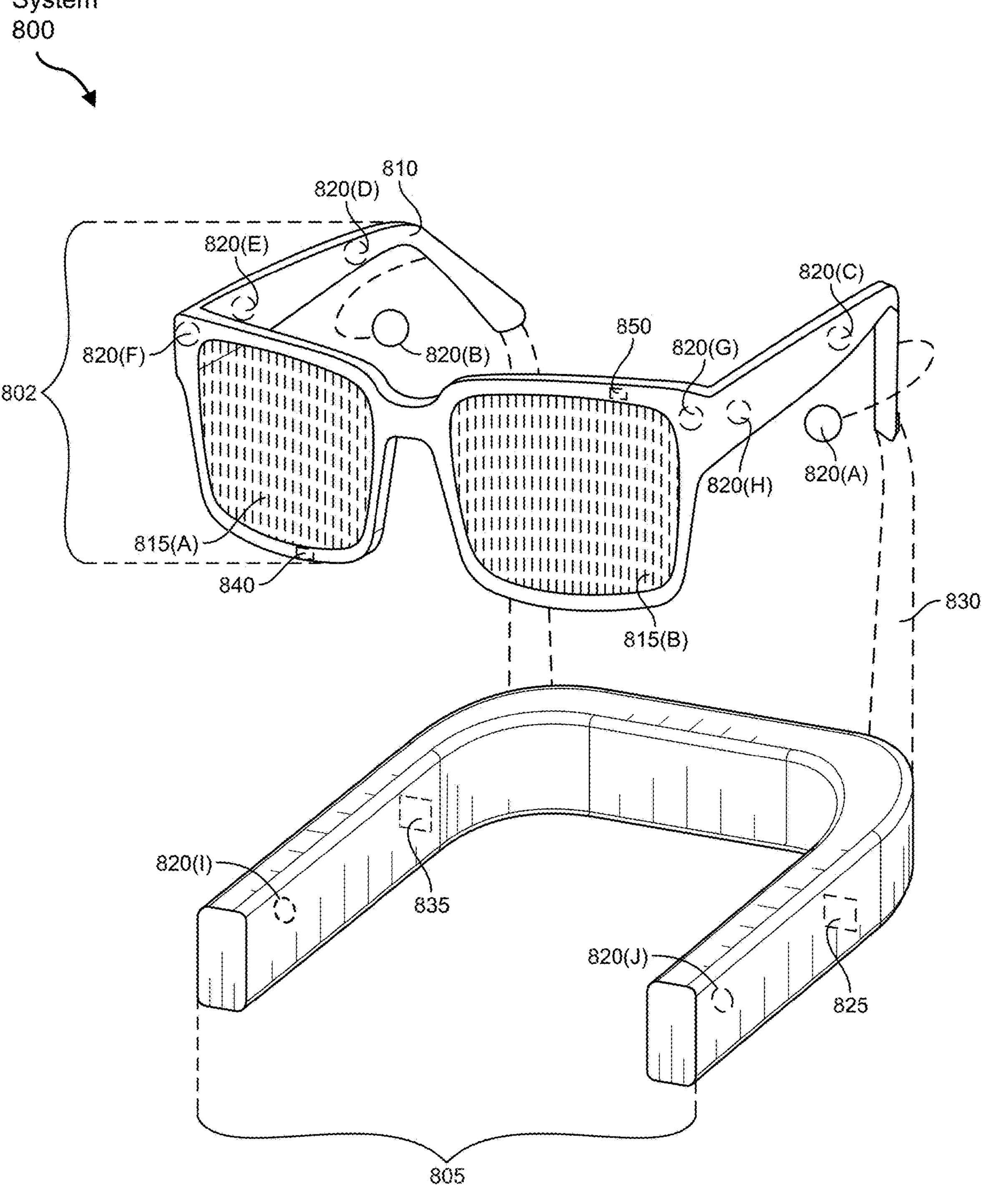
FIG. 8 is an illustration of exemplary augmented-reality glasses that may be used in connection with embodiments of this disclosure.
Figure 9:
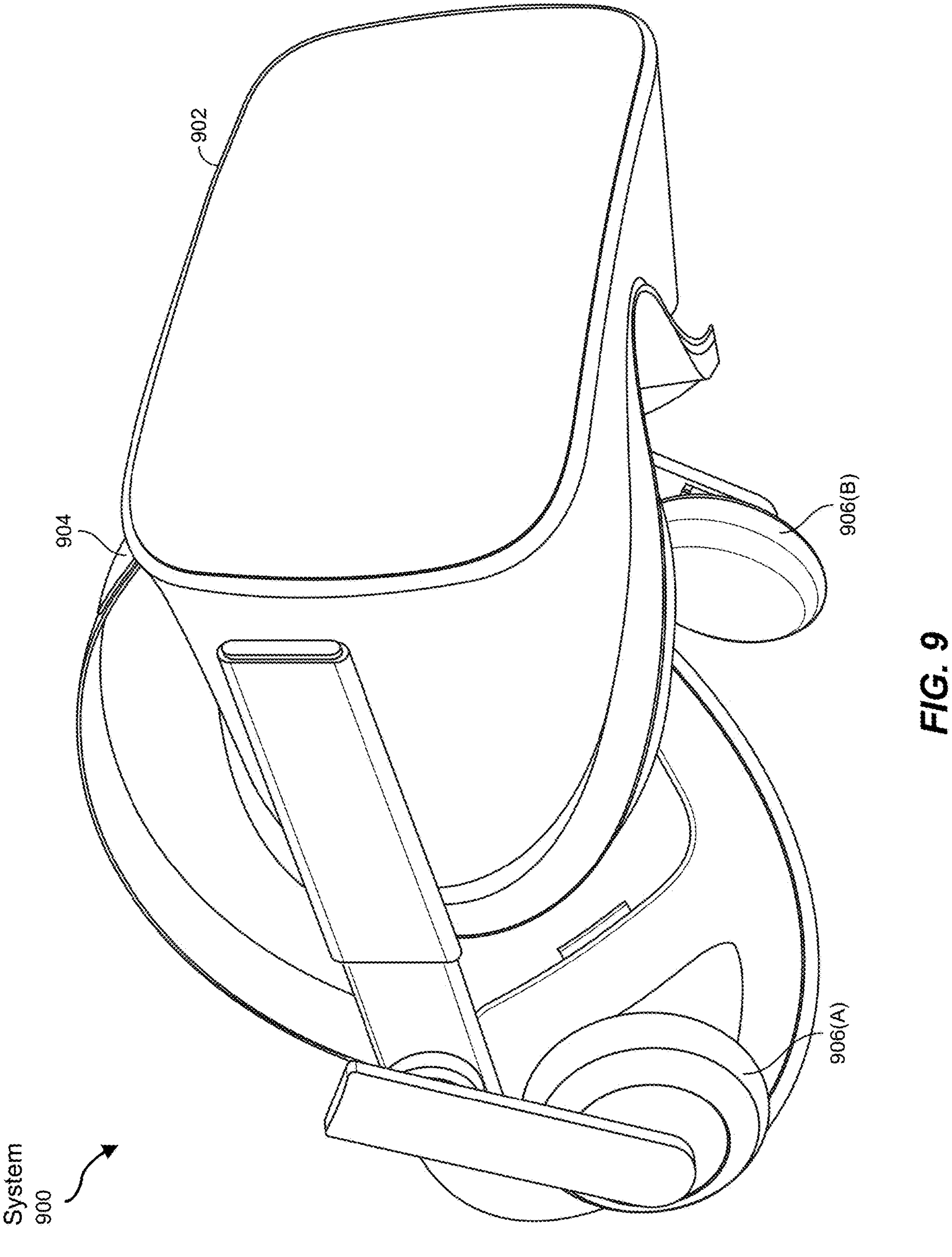
FIG. 9 is an illustration of an exemplary virtual-reality headset that may be used in connection with embodiments of this disclosure.

Turning to FIG. 8, augmented reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality system 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external computing devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable for the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and

906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Discs (CDs), Digital Video Discs (DVDs), and BLU-RAY discs), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

a conductive support structure; and at least one lens mounted to the support structure, wherein a first layer including a transparent antenna film layer is disposed on at least a portion of the lens, forming a gap between the support structure and the transparent antenna film layer, such that the gap forms at least one of a loop antenna or a slot antenna, wherein the transparent antenna film layer is directly connected to the support structure via a substrate, and wherein a high-impedance component is electrically connected to a second layer of the lens, causing the second layer to float relative to the transparent antenna film layer.

2. The system of claim 1, wherein the gap is sized to tune at least one operating characteristic of the loop antenna or the slot antenna.

3. The system of claim 1, wherein the high-impedance component electrically connected to the second layer of the lens comprises an impedance-optimized radio frequency (RF) choke.

4. The system of claim 1, wherein the transparent antenna film layer is directly electrically connected to an antenna port.

5. The system of claim 4, wherein the transparent antenna film layer is directly electrically connected to the antenna port through a flexible substrate.

6. The system of claim 1, wherein the transparent antenna film layer comprises a printed transparent conductive material.

7. The system of claim 6, wherein the transparent antenna film layer comprises meshed metal.

8. The system of claim 1, wherein the transparent antenna film layer is disposed on a conductive layer of the lens.

9. The system of claim 8, wherein the conductive layer of the lens comprises an active dimming layer.

10. The system of claim 9, wherein the transparent antenna film layer substantially covers the conductive layer of the lens.

11. The system of claim 1, wherein the lens includes a top nonconductive layer, a top active dimming layer, a liquid crystal layer, and a bottom floating layer.

12. The system of claim 1, wherein the transparent antenna film layer and the second layer of the lens are separated by at least a specified distance.

13. The system of claim 12, wherein the second layer of the lens is conductive and is electrically floating at an operating frequency of the antenna.

14. A wearable mobile device comprising:

a conductive support structure; and at least one lens mounted to the support structure, wherein a first layer including a transparent antenna film layer is disposed on at least a portion of the lens, forming a gap between the support structure and the transparent antenna film layer, such that the gap forms at least one of a loop antenna or a slot antenna, wherein the transparent antenna film layer is directly connected to the support structure via a flexible substrate, and wherein a high-impedance component is electrically connected to a second layer of the lens, causing the second layer to float relative to the transparent antenna film layer.

15. The wearable mobile device of claim 14, wherein the lens comprises the first conductive layer and the second conductive layer separated by at least a specified distance.

16. The wearable mobile device of claim 15, wherein the lens further comprises an intermediary nonconductive layer disposed on top of the first conductive layer, and wherein the transparent antenna film layer is disposed on the intermediary nonconductive layer.

17. The wearable mobile device of claim 14, wherein the second layer is a conductive layer and is designed to electrically float at an operating frequency of the antenna.

18. The wearable mobile device of claim 14, wherein at least one of a transparent antenna film layer thickness, a transparent antenna film layer size, a size of the gap between the support structure and the transparent antenna film layer, or an active dimming layer resistivity is modified to change antenna operating characteristics.

19. The wearable mobile device of claim 14, wherein the support structure comprises a metal frame.

20. An apparatus comprising:

a conductive support structure; and at least one lens mounted to the support structure, wherein a first layer including a transparent antenna film layer is disposed on at least a portion of the lens, forming a gap between the support structure and the transparent antenna film layer, such that the gap forms at least one of a loop antenna or a slot antenna, wherein the transparent antenna film layer is directly connected to the support structure via a flexible substrate, and wherein a high-impedance component is electrically connected to a second layer of the lens, causing the second layer to float relative to the transparent antenna film layer.

* * * * *